(12) United States Patent
Rarick (10) Patent No.: US 7,401,110 B1
(45) Date of Patent: Jul. 15, 2008

(54) SYSTEM, METHOD AND APPARATUS FOR AN IMPROVED MD5 HASH ALGORITHM

(75) Inventor: Leonard D. Rarick, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 708 days.

(21) Appl. No.: 10/938,462

(22) Filed: Sep. 9, 2004

(51) Int. Cl.
G06F 7/50 (2006.01)

(52) U.S. Cl. ..................................... 708/700
(58) Field of Classification Search .......... 708/710–714
See application file for complete search history.

(56) References Cited

U.S. PATENT DOCUMENTS

| | | | | |
|---|---|---|---|---|
| 3,993,891 A * | 11/1976 | Beck et al. | .................. | 708/710 |
| 4,761,760 A * | 8/1988 | Tomoji | ........................ | 708/714 |
| 5,146,421 A * | 9/1992 | Adiletta et al. | .............. | 708/626 |
| 5,943,251 A * | 8/1999 | Jiang et al. | ................... | 708/710 |
| 6,393,454 B1 * | 5/2002 | Chu | ............................ | 708/630 |
| 6,629,119 B1 * | 9/2003 | Chen et al. | .................... | 708/620 |
| 6,973,471 B2 * | 12/2005 | Nguyen | ....................... | 708/627 |
| 2002/0040379 A1 * | 4/2002 | Amer | ......................... | 708/523 |
| 2002/0066014 A1 * | 5/2002 | Dworkin et al. | ............. | 713/168 |
| 2004/0076292 A1 * | 4/2004 | Sato | ............................ | 380/30 |
| 2007/0011467 A1 * | 1/2007 | Law | ........................... | 713/189 |

FOREIGN PATENT DOCUMENTS

DE 3545433 A1 * 7/1986
KR 2004017434 A * 2/2004

* cited by examiner

*Primary Examiner*—Tan V Mai
(74) *Attorney, Agent, or Firm*—Martine Penilla & Gencarella, LLP (57) ABSTRACT

An MD5 arithmetic unit including multiple carry look-ahead adders. The carry look-ahead adders are configured to execute substantially simultaneously. A method of executing an MD5 algorithm is also disclosed.

24 Claims, 9 Drawing Sheets

| | Left Portion | | | | | | | Center | Right Portion | | | | | | |
|---|---|---|---|---|---|---|---|---|---|---|---|---|---|---|---|
| | $P_{31}$ | $P_{30}$ | $P_{29}$ | $P_{28}$ | ... | $P_2$ | $P_1$ | $P_0$ | $P_{31}$ | $P_{30}$ | $P_{29}$ | $P_{28}$ | ... | $P_1$ | $P_0$ |
| | $Q_{31}$ | $Q_{30}$ | $Q_{29}$ | $Q_{28}$ | ... | $Q_2$ | $Q_1$ | $Q_0$ | $Q_{31}$ | $Q_{30}$ | $Q_{29}$ | $Q_{28}$ | ... | $Q_1$ | $Q_0$ |
| | $T_{31}$ | $T_{30}$ | $T_{29}$ | $T_{28}$ | ... | $T_2$ | $T_1$ | $T_0$ | $T_{31}$ | $T_{30}$ | $T_{29}$ | $T_{28}$ | ... | $T_1$ | $T_0$ |
| | 0 | 0 | 0 | $B_{31}$ | ... | $B_5$ | $B_4$ | $B_3$ | $B_2$ | $B_1$ | $B_0$ | 0 | ... | 0 | 0 |
| | $K_{31}$ | $K_{30}$ | $K_{29}$ | $K_{28}$ | ... | $K_2$ | $K_1$ | $K_0$ | $G_{31}$ | $G_{30}$ | $G_{29}$ | $G_{28}$ | ... | $G_1$ | $G_0$ |
| | $L_{31}$ | $L_{30}$ | $L_{29}$ | $L_{28}$ | ... | $L_2$ | $L_1$ | | $H_{31}$ | $H_{30}$ | $H_{29}$ | $H_{28}$ | ... | $H_1$ | $H_0$ |
| | $M_{31}$ | $M_{30}$ | $M_{29}$ | $M_{28}$ | ... | $M_2$ | $M_1$ | | $S_{31}$ | $S_{30}$ | $S_{29}$ | $S_{28}$ | ... | $S_1$ | $S_0$ |
| | $N_{31}$ | $N_{30}$ | $N_{29}$ | $N_{28}$ | ... | $N_2$ | $N_1$ | | | | | | | | |

| $B'_{31}$ | ... | $B'_5$ | $B'_4$ | $B'_3$ | $B'_2$ | $B'_1$ | $B'_0$ |
|---|---|---|---|---|---|---|---|

SYSTEM, METHOD AND APPARATUS FOR AN IMPROVED MD5 HASH ALGORITHM

BACKGROUND OF THE INVENTION

1. Field of the Invention

The present invention relates generally to hardware cryptographic execution unit, and more particularly, to methods and systems for an improved MD5 cryptographic execution unit.

2. Description of the Related Art

Data encryption has become commonplace. By way of example, the commonplace e-commerce transactions that occur between customers and merchants on the Internet have driven the demand for efficient and secure interchange of sensitive, personal, financial data between the parties. There are four basic categories of cryptographic algorithm functionality: public key encryption algorithms, bulk encryption algorithms, random number generation algorithms and hashing algorithms. In order to ensure data integrity, several standard cryptographic hash algorithms have been developed and include: MD5 (i.e., Message Digest 5), SHA1 (i.e., secure hash algorithm) and other cryptographic hash algorithms. The MD5 and SHA1 algorithms are described in detail in the "Handbook of Applied Cryptography" by authors Alfred J. Mendezes, Paul C. van Oorschot and Scott A Vanstone, which is incorporated by reference herein for all purposes.

Briefly described, MD5 is a one-way hash function algorithm that is used in many situations, such as to create digital signatures. MD5 was designed for use with 32 bit machines and is more secure than earlier cryptographic algorithms (e.g., MD4 algorithm). A one-way hash function means that MD5 takes a message and converts it into a fixed-length string of digits (i.e., a message digest). The one-way hash function allows a calculated message digest to be compared against the message digest that is decrypted with a public key to verify that the message hasn't been tampered with. This comparison is called a "hashcheck."

Figure 1:
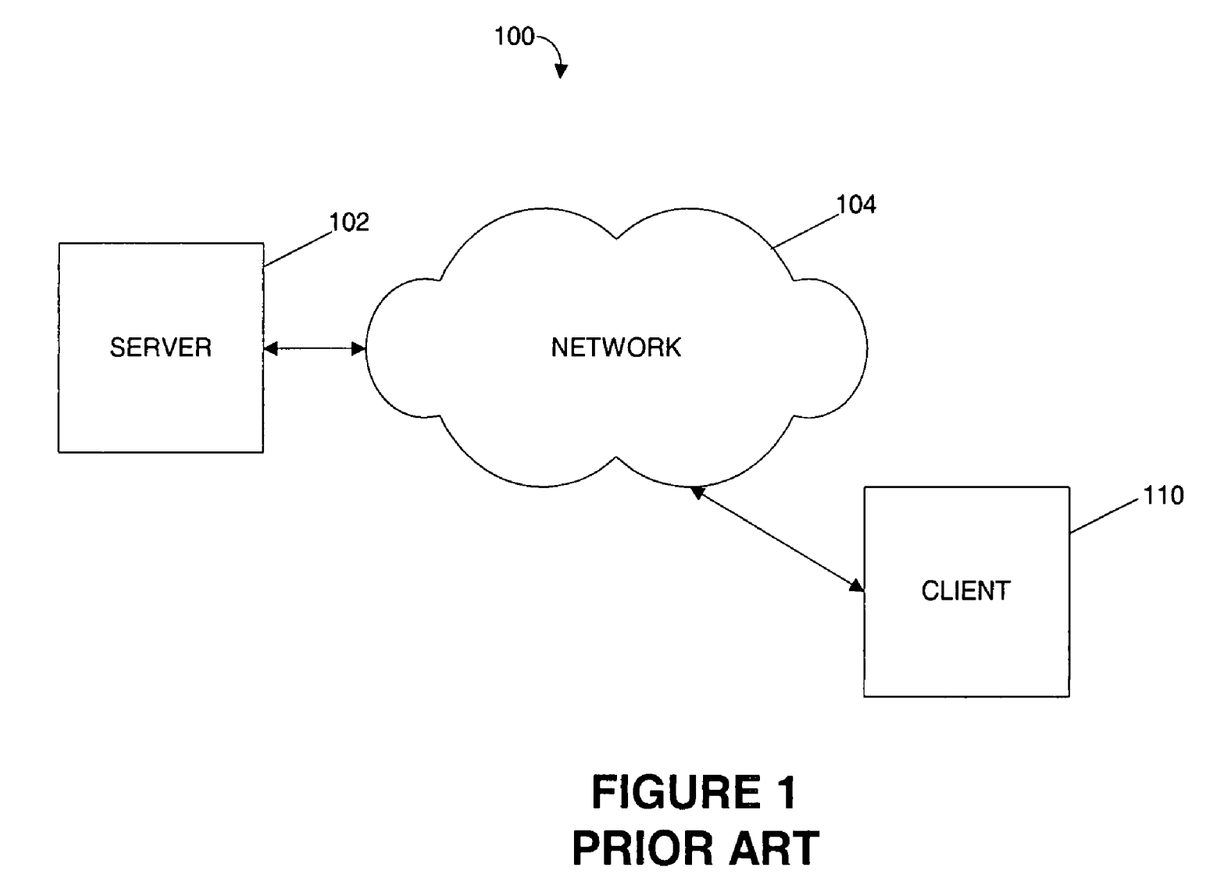
FIG. 1 shows a typical server and client computer that are linked by a network, such as the Internet or other network.
Figure 2:
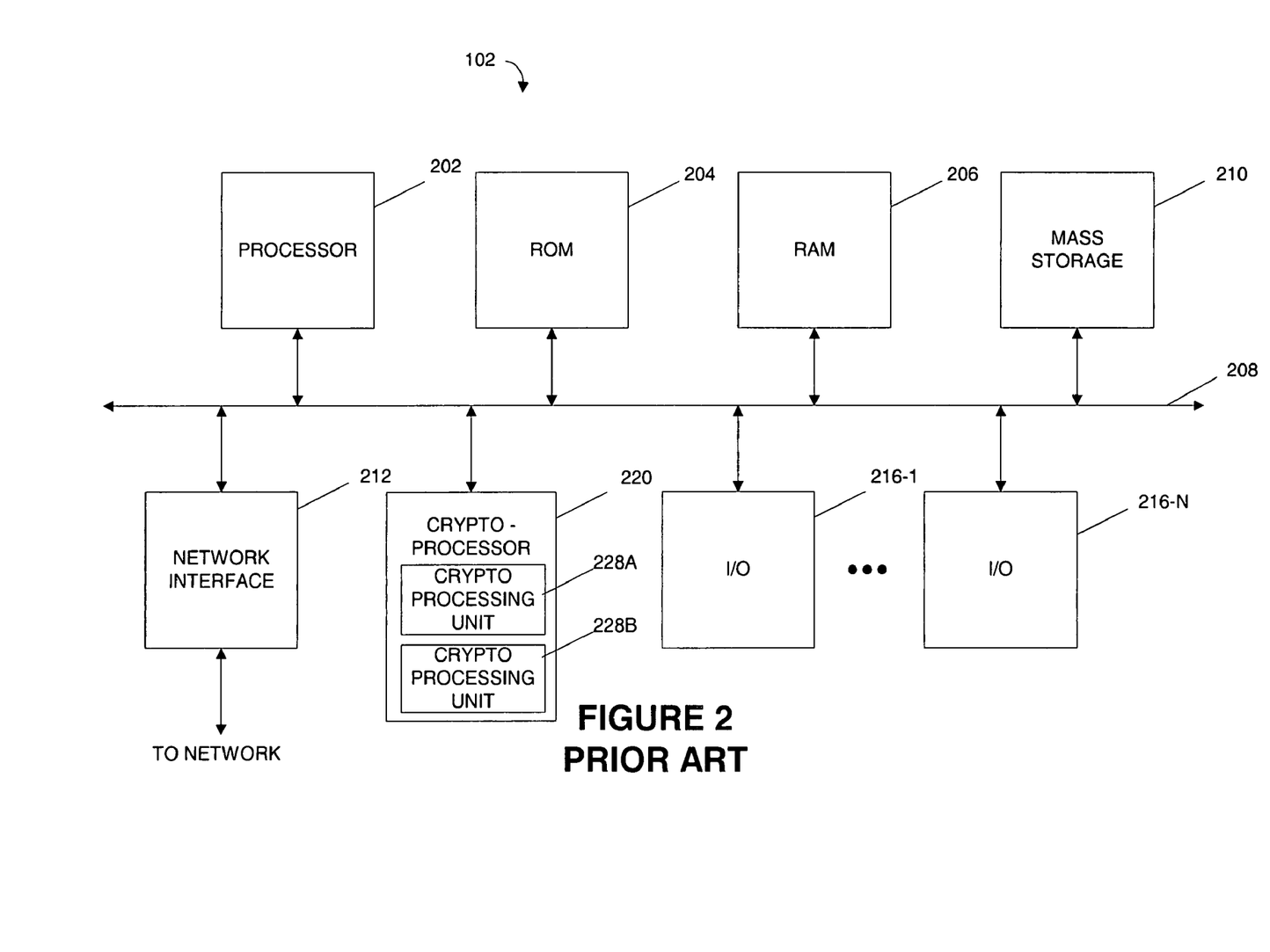
FIG. 2 is a high-level block diagram of a typical server.

FIG. 1 shows a typical server 102 and client computer 110 that are linked by a network 104, such as the Internet or other network. FIG. 2 is a high-level block diagram of a typical server 102. As shown, the server 102 includes a processor 202, ROM 204, and RAM 206, each connected by a peripheral bus system 208. The peripheral bus system 208 may include one or more buses coupled to each other through various bridges, controllers and/or adapters, such as are well known in the art. For example, the peripheral bus system 208 may include a "system bus" that is connected through an adapter to one or more expansion buses, such as a Peripheral Component Interconnect (PCI) bus. Also coupled to the peripheral bus system 208 are a mass storage device 210, a network interface 212, a number (N) of input/output (I/O) devices 216-1 through 216-N and a peripheral cryptographic processor 220.

I/O devices 216-1 through 216-N may include, for example, a keyboard, a pointing device, a display device and/or other conventional I/O devices. Mass storage device 210 may include any suitable device for storing large volumes of data, such as a magnetic disk or tape, magneto-optical (MO) storage device, or any of various types of Digital Versatile Disk (DVD) or Compact Disk (CD) based storage.

The peripheral cryptographic processor 220 (i.e., crypto-processor) is linked to the processor 202 by the peripheral bus system 208. The crypto-processor 220 includes one or more crypto processing units 228A, 228B. Each of the crypto processing units 228A, 228B is for performing a single crypto algorithm (e.g., MD5 or SHA1). The crypto-processor 220 performs encryption and decryption operations that may be necessary for encrypted data transactions such as between the server 102 and the client 110. In some servers the crypto-processor 220 can also be external to the server 102 and linked to the processor 202 by one of the I/O devices 216-1 through 216-N.

Network interface 212 provides data communication between the computer system and other computer systems on the network 104. Hence, network interface 212 may be any device suitable for or enabling the server 102 to communicate data with a remote processing system (e.g., client computer 110) over a data communication link, such as a conventional telephone modem, an Integrated Services Digital Network (ISDN) adapter, a Digital Subscriber Line (DSL) adapter, a cable modem, a satellite transceiver, an Ethernet adapter, or the like.

Typically the processor 202 can operate at clock speeds of up to or even more than 1 GHz. Conversely, the peripheral bus system 208 typically operates at a substantially slower speed such as about 166 MHz or similar. Further, the crypto-processor 220 typically operates at a speed similar to the peripheral bus system 208. This is because the crypto-processor 220 cannot process data any faster than the data can be transported across the peripheral bus system 208. Further, the crypto-processor 220 is typically a customized, specialized processor (i.e. an application specific integrated circuit (ASIC)) that may not be made by the latest, highest performance manufacturing technologies and therefore the maximum processing speed (i.e., the crypto-processor clock speed) of the crypto-processor 220 is typically substantially less than the maximum processing speed of the processor 202.

Figure 3:
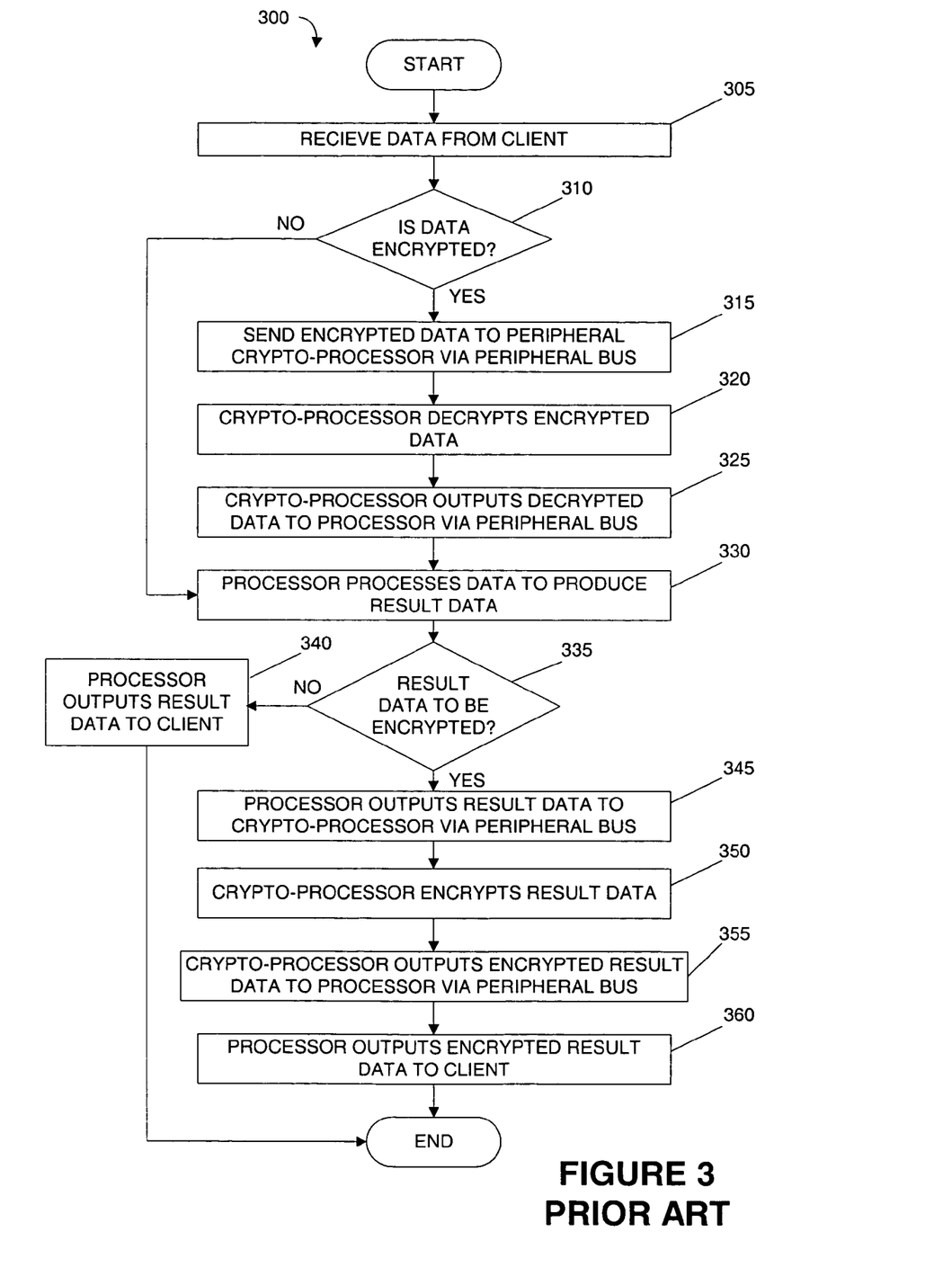
FIG. 3 is a flowchart diagram of the method operations of a typical encrypted data transaction within the server.

FIG. 3 is a flowchart diagram of the method operations 300 of a typical encrypted data transaction within the server 102. The encrypted data transaction can be any data transaction that required encryption, decryption or both encryption and decryption such as an e-commerce transaction between the server 102 and the client computer 110. In operation 305, data is received in the server 102 such as from the client computer 110 or because of a request by the client computer 110.

In operation 310, the received data is analyzed to determine if the received data is encrypted. For example, the data may be encrypted because the data includes a user's personal and/or financial data or other data that is transported during an encrypted session.

If the received data is found to not be encrypted data, in operation 310, then the received data is processed as described in operation 330 below. Alternatively, if, in operation 310, the received data is determined to be encrypted data, then, in operation 315, the encrypted data is sent to the peripheral crypto processor 220 via the peripheral bus system 208.

In operation 320, the crypto processor 220 decrypts the encrypted data. In operation 325, the crypto processor 220 outputs the decrypted data to the processor 202 via the peripheral bus system 208. In operation 330, the processor 202 processes the data to produce result data.

In operation 335, the result data is analyzed to determine if the result data should be encrypted. If the result data does not require encryption, then the processor outputs the result data to the client 110, in operation 340, and the method operations end. Alternatively, if, in operation 335, the result data required encryption, then in operation 345, the processor outputs the result data to the crypto-processor via the peripheral bus system 208.

In operation 350, the crypto processor 220 encrypts the result data. In operation 355, the crypto processor 220 outputs the encrypted result data to the processor 202 via the peripheral bus system 208. In operation 360, the processor outputs the encrypted result data to the client 110 and the method operations end.

Transferring the data to be encrypted, decrypted or processed between the crypto processor 220 and the processor 202 is very slow. Further, the slower processing speed of the crypto processor 220 also limits the rate at which the data is encrypted or decrypted. Further, if a large volume of data such as streaming data (e.g., streaming audio, streaming video, etc.) is being encrypted and/or decrypted then the rate the server 102 can serve the streaming data is limited by the rate at which the streaming data can be encrypted and/or decrypted. Further still, the multiple transfers of the streaming data between the crypto processor 220 and the processor 202 can dominate the usage of the peripheral bus system 208 and the I/O systems inside the crypto processor 220 and the processor 202, thereby limiting further the ability of the processor 202 to perform any functions other than transferring data to and from the crypto processor 220.

As speed of execution is nearly always a paramount consideration, then the crypto processors 220 need to perform as fast as possible. By way of example a typical MD5 hash algorithm iteration may require four clock cycles (e.g., a 4-stage pipeline for the processor performing the hash computation) and a complete computation of the MD5 hash algorithm requires 64 iterations of the iterative portion of the MD5 hash algorithm. As a result, 256 clock cycles may be required to complete the computation of the MD5 hash algorithm. The MD5 hash algorithm requires only 64 iterations, rather than the 80 iterations for a typical SHA-1. However, the SHA-1 iterations need only half as many clock cycles as MD5, thus due to the additional clock cycles required for each iteration, the MD5 requires about 60% greater clock cycles than the SHA-1 (i.e., 256 clocks cycles for the MD5 vs. 160 clock cycles for the SHA-1).

In view of the foregoing, there is a need for an improved crypto arithmetic logic unit that can substantially reduce the processing time for an MD5 hash algorithm.

SUMMARY OF THE INVENTION

Broadly speaking, the present invention fills these needs by providing an improved MD5 hash algorithm and cryptographic execution unit. It should be appreciated that the present invention can be implemented in numerous ways, including as a process, an apparatus, a system, computer readable media, or a device. Several inventive embodiments of the present invention are described below.

One embodiment provides an MD5 arithmetic unit including and multiple carry look-ahead adders. The carry look-ahead adders are configured to execute substantially simultaneously. The MD5 arithmetic unit can also include a pair of full adders configured to execute substantially simultaneously.

The MD5 arithmetic unit can also include a 4 to 2 compressor and a first one of the carry look-ahead adders having a pair of input coupled to the corresponding pair of outputs of the 4 to 2 compressor. The MD5 arithmetic unit can also include a control logic. The MD5 arithmetic unit can also include a pair of full adders having two inputs coupled to a corresponding pair of outputs of the 4 to 2 compressor. The control logic can include a first input coupled to an output of the first one of the carry look-ahead adders; a second input coupled to a first output of a first one of the pair of full adders; a third input coupled to a first output of a second one of the pair of full adders; and a fourth input coupled to an output of a second one of the plurality of carry look-ahead adders.

The carry look-ahead adders can include four of carry look-ahead adders. The pair of full adders can be configured to execute substantially simultaneously. The MD5 arithmetic unit can also include multiple shift logic. The shift logic can include a shift right logic and at least one shift left logic. The multiple shift logic can be configured to execute substantially simultaneously.

The MD5 arithmetic unit can be included on a single die with a microprocessor. The MD5 arithmetic unit can be coupled to a microprocessor. The MD5 arithmetic unit can be coupled to the microprocessor by a bus. The MD5 arithmetic unit can be coupled to a computer.

Another embodiment provides an integrated circuit. The integrated circuit includes an MD5 arithmetic unit that includes multiple carry look-ahead adders. The carry look-ahead adders are configured to execute substantially simultaneously. The integrated circuit can also include a microprocessor core.

The integrated circuit can also include a 4 to 2 compressor and a pair of full adders having two inputs coupled to a corresponding pair of outputs of the 4 to 2 compressor. A first one of the carry look-ahead adders having a pair of input coupled to the corresponding pair of outputs of the 4 to 2 compressor. The integrated circuit can also include a control logic that includes a first input coupled to an output of the first one of the carry look-ahead adders; a second input coupled to a first output of a first one of the pair of full adders; a third input coupled to a first output of a second one of the pair of full adders; and a fourth input coupled to an output of a second one of the plurality of carry look-ahead adders.

Yet another embodiment provides a method of executing an MD5 algorithm. The method includes initializing a plurality of MD5 variables including and X, Y, A, B, C, and D variables. An MD5 function is selected and applied to the B, C and D variables to produce an interim value E. The X, Y, A and E are input to a 4 to 2 compressor to produce a pair of outputs. The pair of outputs are coupled to multiple carry look-ahead adders and the multiple carry look-ahead adders are executed substantially simultaneously.

Coupling the pair of outputs to the multiple carry look-ahead adders can include coupling the pair of outputs directly to a first one of the carry look-ahead adders. Coupling the pair of outputs to the multiple carry look-ahead adders can also include coupling the pair of outputs to a pair of full adders and coupling a pair of outputs from the first one of the pair of full adders to a second carry look-ahead adder and coupling a pair of outputs from the second one of the pair of full adders to a third carry look-ahead adder and a fourth carry look-ahead adder.

The method can also include executing the pair of full adders substantially simultaneously. The method can also include shifting a corresponding output of each one of the second, third and fourth carry look-ahead adders. The corresponding output of each one of the second, third and fourth carry look-ahead adders can be shifted substantially simultaneously.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION OF THE EXEMPLARY EMBODIMENTS

Several exemplary embodiments for an improved MD5 hash algorithm and cryptographic execution unit will now be described. It will be apparent to those skilled in the art that the present invention may be practiced without some or all of the specific details set forth herein.

As a general overview, the MD5 algorithm uses four chaining variables: H1, H2, H3 and H4, and four working variables: A, B, C and D. The chaining variables and working variables each have 32 bits. Before processing, the MD5 algorithm must be initialized. The MD5 algorithm hashes sixteen 32-bit words: X[0] through X[15] at a time. Each hashing of sixteen words requires sixty-four iterations. For each iteration "j", the following is executed:

T=A+function [j](B, C, D)+X[z[j]]+Y[j]
next A=D
next B=B+rotated [j](T)
next C=B
next D=C Where z[j] selects one of the input X values and each Y[j] is a specified 32-bit constant. The function performed and the amount T is rotated is determined by the particular iteration j. Four functions (i.e., f, g, h and k) are used:

f=(C and B) or (D and not B) is used for the first 16 iterations (iterations 0-15)

g=(B and D) or (C and not D) is used for the second 16 iterations (iterations 16-31)

h=B xor C xor D is used for the third 16 iterations (iterations 32-47)

k=C xor (B or not D) is used for the fourth 16 iterations (iterations 48-63)

After the 64 iterations, the chaining variables H1-H4 are updated as follows:

next H1=A+H1
next H2=B+H2
next H3=C+H3
next H4=D+H4

It should be understood that the chaining variables H1-H4 can be updated as the respective working variables A, B, C and D become available, rather than delaying updating until after the 64 iterations are completed. After the last 512-bit block has been processed, the hash value is the 128-bit concatenation of the chaining variables H1-H4.

Figure 4:
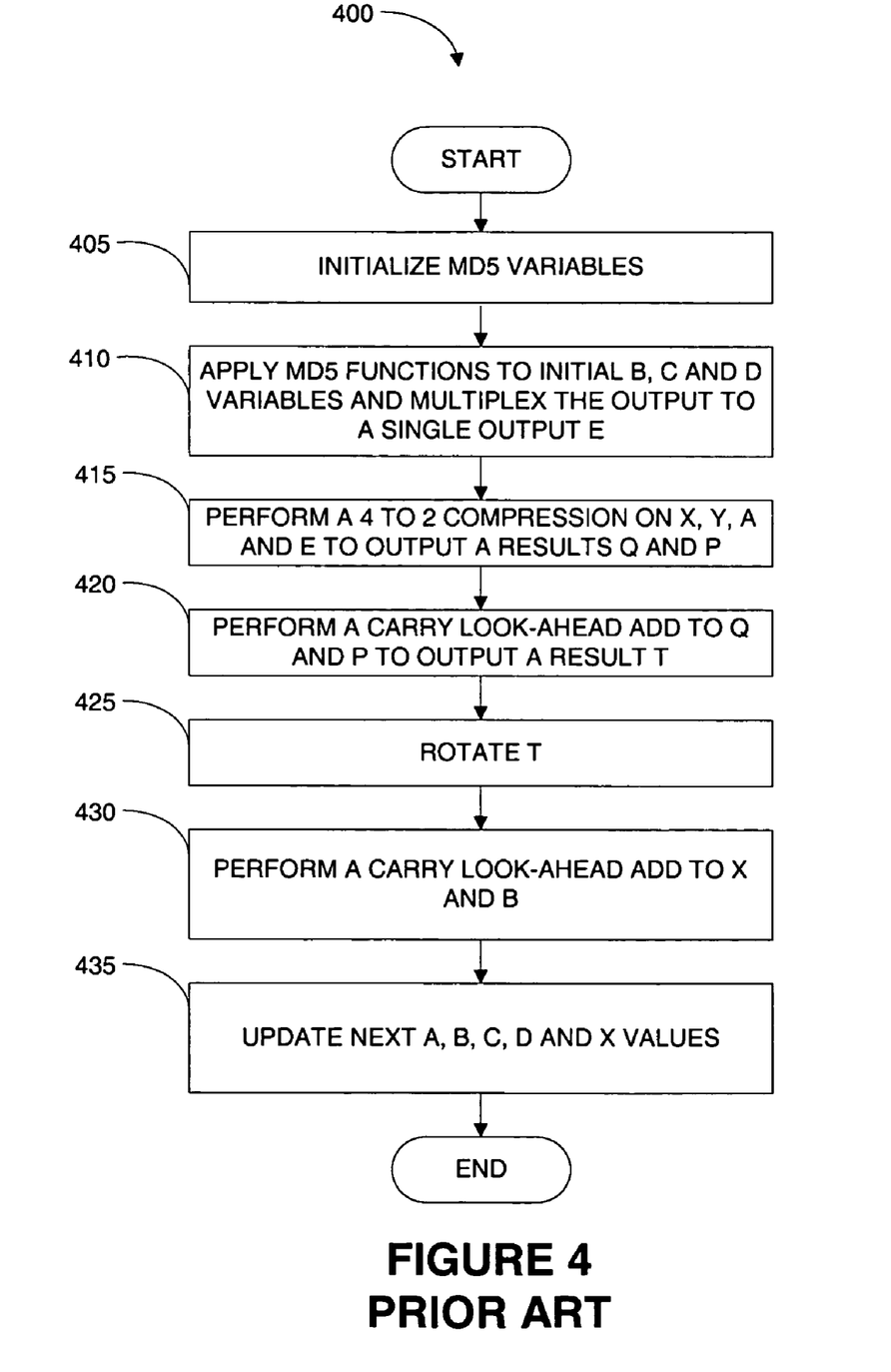
FIG. 4 is a flowchart diagram that illustrates the method operations performed in an iterative portion of the MD5 algorithm.
Figure 5:
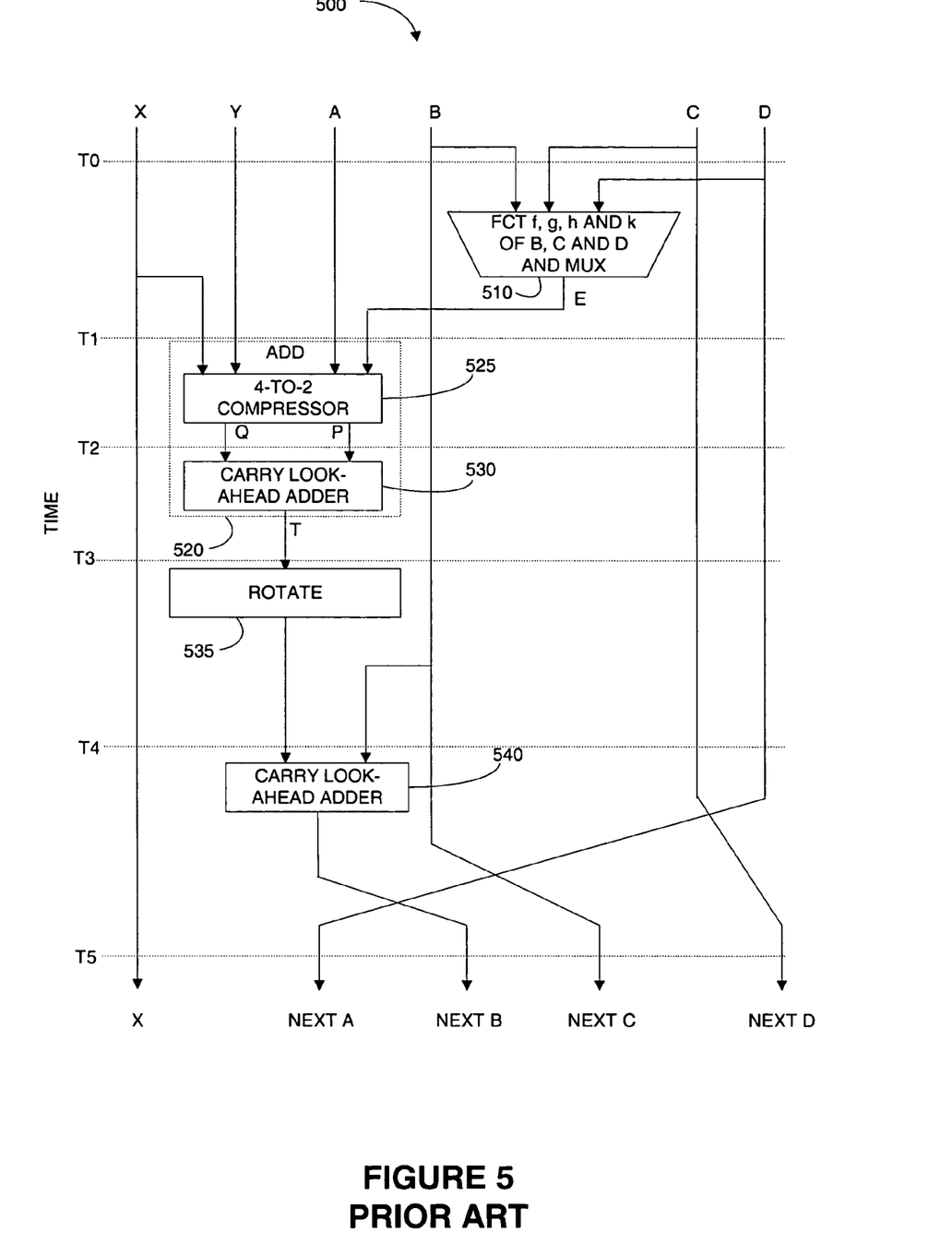
FIG. 5 is a logic diagram of a MD5 arithmetic logic unit.

FIG. 4 is a flowchart diagram that illustrates the method operations 400 performed in an iterative portion of the MD5 algorithm as is traditionally implemented. FIG. 5 is a logic diagram 500 of a MD5 arithmetic logic unit as is traditionally implemented. At a time T0, in an operation 405, the MD5 algorithm is initialized. During the initialization, the initial values of each of the chaining and working variables are set.

In an operation 410, initial working variables B, C and D are input to the MD5 function and multiplex (MUX) block 510. The MD5 functions (f, g, h or k as applicable) are applied to the working variables B, C and D. One of the four MD5 function results is selected and output as E. The selection of the function and the result selected is dependent on the iteration count.

The add block 520 adds X, Y, A and E values. To add the four values, X, Y, A and E are input to a 4-to-2 compressor 525, in an operation 415 at a time T1. The 4-to-2 compressor 525 outputs two variables Q and P to a carry look-ahead adder 530. It is well known in the art that a 4-to-2 compressor is functionally equivalent to two full adders. At a time T2, in an operation 420, a carry look-ahead add is applied to Q and P to produce a result T.

At a time T3, in an operation 425, T is applied to a rotate block 535 and T is rotated. The amount T is rotated is determined by the iteration count.

At a time T4, in an operation 430, the output of the rotate block 535 (i.e., rotated T) and the working variable B are input to a second, carry look-ahead adder 540.

At a time T5, in an operation 435, the variables A, B, C, D and X are updated as follows: The output of the carry look-ahead adder 540 is output as a next B (i.e., B') working variable. The current B working variable becomes the next C working variable. The current C working variable becomes the next D working variable. The current D working variable becomes the next A working variable. The current X values are retained as the X values.

By way of example, in a given class or type or physical size of logic devices, each logic gate requires about 0.1 ns to switch. The 0.1 ns switching time is referred to as a gate delay. In addition, a relatively small time can also be consumed by transit delays. Transit delays are the time required for a logical signal to propagate along a conductor. The transit delays are determined by a number of aspects including conductor length and width and parasitic loads on the conductor. The total processing time of a logic circuit such as the MD5 arithmetic logic unit 500 is determined in large part by the gate delays and transit delays. If one gate delay is equal to about 0.1 ns, then the MD5 arithmetic logic unit 500 requires about 25 gate delays (including the typical transit delays) or about 2.5 ns to process each iteration of the MD5 algorithm.

A typical clock speed for a computer that would include a MD5 arithmetic logic unit 500 is about 1 GHz. Each cycle of a 1 GHz clock has a length of about 1.0 ns. Many processors use multi-stage pipelines to input instructions and data into the processor for execution. As 2.5 ns is required for each iteration of the MD5 algorithm, then at least 3 clock cycles must be consumed by each iteration. As a result, a pipeline processor would require a 3-stage pipeline to wait for each iteration result of the MD5 algorithm. If the pipeline processor is also used for SHA-1, then it would likely use an even number of stages. Therefore a typical processor would require a four stage pipeline and wait four clock cycles for each iteration of the MD5 algorithm and a complete computation of the MD5 hash algorithm requires 64 iterations of the iterative portion of the MD5 hash algorithm. As a result, 256 clock cycles are required to complete the computation of the MD5 hash algorithm in the MD5 arithmetic logic unit 500.

Figure 6:
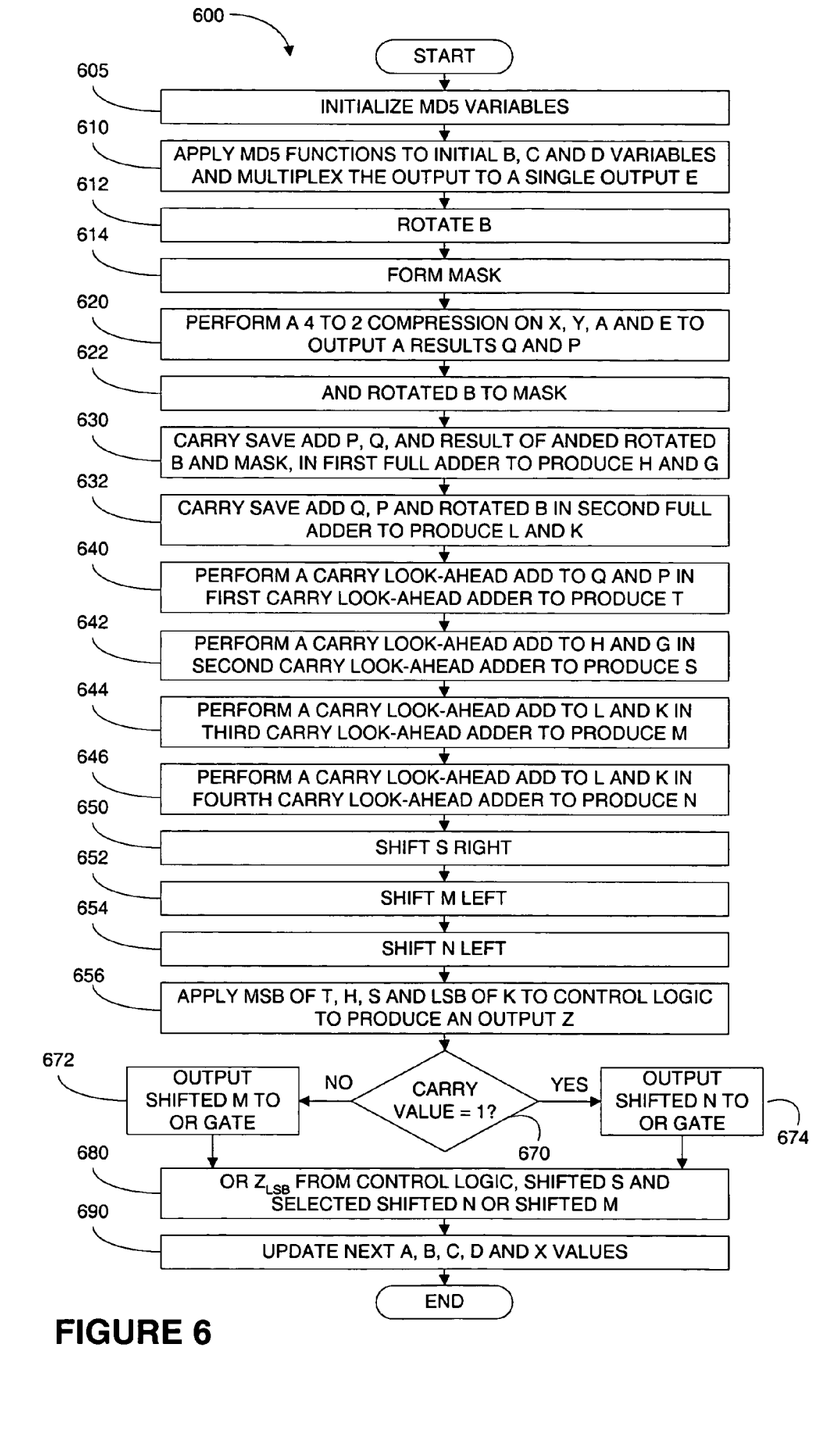
FIG. 6 is a flowchart diagram that illustrates the method operations performed in an iterative portion of an improved MD5 algorithm, in accordance with one embodiment of the present invention.
Figure 7:
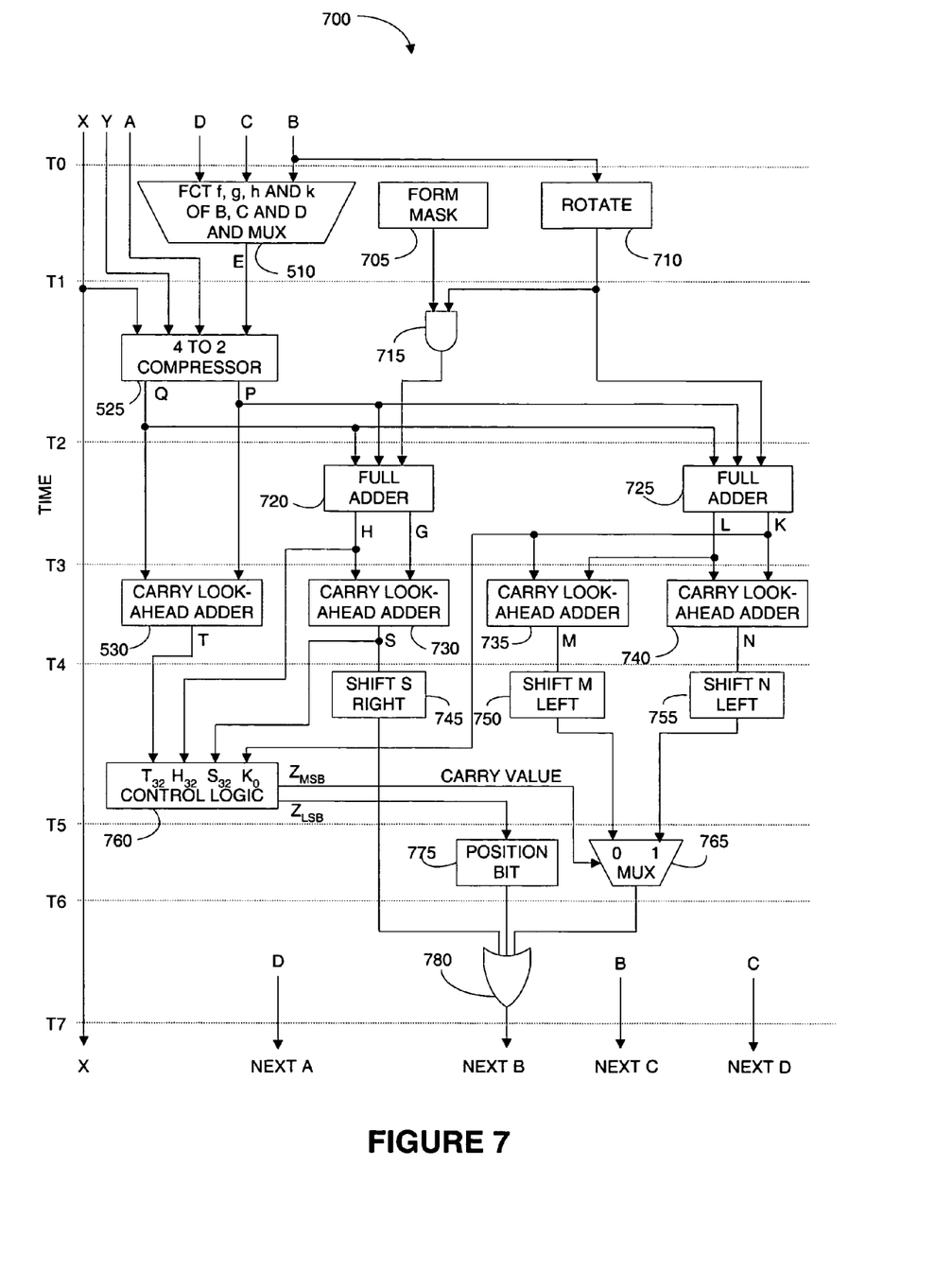
FIG. 7 is a logic diagram of an improved MD5 arithmetic logic unit, in accordance with one embodiment of the present invention.

FIG. 6 is a flowchart diagram that illustrates the method operations 600 performed in an iterative portion of an improved MD5 algorithm, in accordance with one embodiment of the present invention. FIG. 7 is a logic diagram 700 of an improved MD5 arithmetic logic unit, in accordance with one embodiment of the present invention. The method operations 600 and the logic diagram 700 of the improved MD5 arithmetic logic unit appear much more complex than those shown in FIGS. 4 and 5 above, however, as will be described in more detail below, parallel logic operations allow the improved MD5 arithmetic logic unit to operate much faster. As a result, the improved MD5 arithmetic logic unit provides a much faster executing MD5 algorithm.

The improved MD5 arithmetic logic unit 700 allows the iterative portion of the MD5 hash algorithm to be performed in a shorter overall elapsed time. By way of example, about 17 to 19 gate delays plus any associated wire transit delays are required for each iteration of the improved MD5 arithmetic logic unit 700. Continuing the above example embodiment where each gate delay can be equal to about 0.1 ns and a clock cycle time of 1 ns, then 17-19 gate delays (i.e., 1.7 to 1.9 ns) are always less than the 2 ns of two clock cycle time. Therefore each iteration through the improved MD5 arithmetic logic unit 700 can be completed in two clock cycles and therefore can be processed through a two-stage pipeline. Further, while the improved MD5 arithmetic logic unit 700 must still execute 64 iterations of the MD5 algorithm, if each iteration can be accomplished in only 2 clock cycles then only 128 clock cycles are required to complete all 64 iterations. This reduces the number of clock cycles by about 50% over the above described MD5 implementation as shown in FIGS. 4 and 5 above.

The improved MD5 arithmetic logic unit 700 reduces the time required for each iteration by increasing the parallel processing of the MD5 hash algorithm. By way of example, the multiple carry look-ahead adders 530, 730, 735, and 740 can execute substantially in parallel (i.e., substantially simultaneously) rather than the serial execution of the carry look-ahead adders 530 and 540 of the MD5 implementation 500 shown in FIG. 5. As a result, the total elapsed time from time T0 to completion of each iteration is significantly reduced. The embodiments of the improved MD5 arithmetic logic unit 700 described herein include multiple logic stages that can be executed in parallel. However, it should be understood that the invention doe not require all of the logic stages capable of being operated in parallel are actually operated in parallel.

For simplicity of description of the following examples, each of the input values (e.g., X, Y, A, B, C and D) and interim values (Q, P, H, G, L, K, M, N, S and T) has been truncated to show only a portion of the 32 bits actually in each number (e.g.: $B_{31}, B_{30}, B_{29}, \ldots, B_2, B_1, B_0$). For simplicity reasons, the rotation is limited to only 3 bits, whereas it should be understood that the actual amount of rotation in the full MD5 hash algorithm is dependent on the particular iteration count. It should also be understood that a $33^{rd}$ bit (e.g., $B_{32}$) can also be shown, where applicable, to represent a carry bit from a function result of two 32 bit numbers.

Referring again to FIGS. 6 and 7, at a time T0 and in an operation 605, the MD5 algorithm is initialized. During the initialization, the initial values of each of the chaining and working variables are set. In an operation 610, initial working variables B, C and D are input to the MD5 function and multiplex (MUX) block 510. The MD5 functions (f, g, h or k as applicable) are applied to the working variables B, C and D. One result of the four MD5 function results is selected and output as E. The selection of the function and the result selected is dependent on the iteration count. Operations 605 and 610 are substantially similar to operations 405 and 410 described in FIG. 4 above.

In an operation 612, B is rotated in a rotate logic 710. For example purposes, B is rotated 3 positions, however, it should be understood that the actual amount of rotation in a MD5 algorithm is dependent on the iteration count. By way of example:

$B = B_{31}, B_{30}, B_{29}, B_{28}, B_{27}, \ldots B_4, B_3, B_2, B_1, B_0$

Rotated $B = B_2, B_1, B_0, B_{31}, B_{30}, \ldots, B_7, B_6, B_5, B_4, B_3$

In an operation 614, a mask is formed in mask logic 705. If B is rotated r bits, then the mask consists of the r most significant bits set to one and the remaining bits set to zero. In the example, r=3.

At a time T1 and in an operation 620 the four values, X, Y, A and E are input to a 4-to-2 compressor 525. The 4-to-2 compressor 525 outputs two variables Q and P. In an operation 622, the rotated B is ANDed with the mask in AND gate logic 715.

At a time T2 two full adder logic blocks 720 and 725 can operate substantially simultaneously. In operation 630, Q and P are added to the output of the AND gate logic 715 in full adder logic 720 to produce interim values H and G. In an operation 632, Q and P are added to the rotated B in full adder logic 725 to produce interim values L and K. By way of examples:

|   | $P_{31}$ | $P_{30}$ | $P_{29}$ | $P_{28}$ | ... | $P_4$ | $P_3$ | $P_2$ | $P_1$ | $P_0$ |
|---|---|---|---|---|---|---|---|---|---|---|
|   | $Q_{31}$ | $Q_{30}$ | $Q_{29}$ | $Q_{28}$ | ... | $Q_4$ | $Q_3$ | $Q_2$ | $Q_1$ | $Q_0$ |
| + | $B_2$ | $B_1$ | $B_0$ | 0 | ... | 0 | 0 | 0 | 0 | 0 |
|   | $G_{31}$ | $G_{30}$ | $G_{29}$ | $G_{28}$ | ... | $G_4$ | $G_3$ | $G_2$ | $G_1$ | $G_0$ |
| $H_{32}$ | $H_{31}$ | $H_{30}$ | $H_{29}$ | $H_{28}$ | ... | $H_4$ | $H_3$ | $H_2$ | $H_1$ |   |

Where the G values are the sum and the H values are the carry value for each respective bit position.

and

|   | $P_{31}$ | $P_{30}$ | $P_{29}$ | $P_{28}$ | ... | $P_4$ | $P_3$ | $P_2$ | $P_1$ | $P_0$ |
|---|---|---|---|---|---|---|---|---|---|---|
|   | $Q_{31}$ | $Q_{30}$ | $Q_{29}$ | $Q_{28}$ | ... | $Q_4$ | $Q_3$ | $Q_2$ | $Q_1$ | $Q_0$ |
| + | $B_2$ | $B_1$ | $B_0$ | $B_{31}$ | ... | $B_7$ | $B_6$ | $B_5$ | $B_4$ | $B_3$ |
|   | $K_{31}$ | $K_{30}$ | $K_{29}$ | $K_{28}$ | ... | $K_4$ | $K_3$ | $K_2$ | $K_1$ | $K_0$ |
| $L_{32}$ | $L_{31}$ | $L_{30}$ | $L_{29}$ | $L_{28}$ | ... | $L_4$ | $L_3$ | $L_2$ | $L_1$ |   |

Where the K values are the sum and the L values are the carry value for each respective bit position.

At a time T3, four carry look-ahead adders 530, 730, 735 and 740 can operate substantially simultaneously. In an operation 640, Q and P can be added in a first carry look-ahead adder 530 to produce interim value T. By way of example:

|   | $P_{31}$ | $P_{30}$ | $P_{29}$ | $P_{28}$ | ... | $P_4$ | $P_3$ | $P_2$ | $P_1$ | $P_0$ |
|---|---|---|---|---|---|---|---|---|---|---|
| + | $Q_{31}$ | $Q_{30}$ | $Q_{29}$ | $Q_{28}$ | ... | $Q_4$ | $Q_3$ | $Q_2$ | $Q_1$ | $Q_0$ |
| $T_{32}$ | $T_{31}$ | $T_{30}$ | $T_{29}$ | $T_{28}$ | ... | $T_4$ | $T_3$ | $T_2$ | $T_1$ | $T_0$ |

In an operation 642, H and G can be added in a second carry look-ahead adder 730 to produce interim value S. By way of example:

|   | $G_{31}$ | $G_{30}$ | $G_{29}$ | $G_{28}$ | ... | $G_4$ | $G_3$ | $G_2$ | $G_1$ | $G_0$ |
|---|---|---|---|---|---|---|---|---|---|---|
| + | $H_{31}$ | $H_{30}$ | $H_{29}$ | $H_{28}$ | ... | $H_4$ | $H_3$ | $H_2$ | $H_1$ |   |
| $S_{32}$ | $S_{31}$ | $S_{30}$ | $S_{29}$ | $S_{28}$ | ... | $S_4$ | $S_3$ | $S_2$ | $S_1$ | $S_0$ |

In operation 644, L and K can be added in the third carry look-ahead adder 735 to produce respective interim value M. The carry look ahead adder 735 adds K and L with a 0 value in the LSB to produce M. The 0 in the LSB is the speculation of the carry value (MSB) output from the control logic 760. By way of example:

| | $K_{31}$ | $K_{30}$ | $K_{29}$ | $K_{28}$ | ... | $K_4$ | $K_3$ | $K_2$ | $K_1$ | 0 |
|---|---|---|---|---|---|---|---|---|---|---|
| + | $L_{31}$ | $L_{30}$ | $L_{29}$ | $L_{28}$ | ... | $L_4$ | $L_3$ | $L_2$ | $L_1$ | 0 |
| $M_{32}$ | $M_{31}$ | $M_{30}$ | $M_{29}$ | $M_{28}$ | ... | $M_4$ | $M_3$ | $M_2$ | $M_1$ | $M_0$ |

In operation 646, L and K can be added in the fourth carry look-ahead adder 740 to produce respective interim value N. The carry look ahead adder 740 adds K and L with a 1 value in the LSB to produce N. The 1 in the LSB is the speculation of the carry value (MSB) output from the control logic 760. By way of example:

| | $K_{31}$ | $K_{30}$ | $K_{29}$ | $K_{28}$ | ... | $K_4$ | $K_3$ | $K_2$ | $K_1$ | 1 |
|---|---|---|---|---|---|---|---|---|---|---|
| + | $L_{31}$ | $L_{30}$ | $L_{29}$ | $L_{28}$ | ... | $L_4$ | $L_3$ | $L_2$ | $L_1$ | 1 |
| $N_{32}$ | $N_{31}$ | $N_{30}$ | $N_{29}$ | $N_{28}$ | ... | $N_4$ | $N_3$ | $N_2$ | $N_1$ | $N_0$ |

At a time T4, three shift logic blocks 745, 750 and 755 can operate substantially in parallel. In an operation 650, the interim value S can be shifted right in shift right logic 745 as follows (for a shift of r=3):

| Input S: | $S_{31}$ | $S_{30}$ | $S_{29}$ | $S_{28}$ | ... | $S_3$ | $S_2$ | $S_1$ | $S_0$ |
|---|---|---|---|---|---|---|---|---|---|
| Shifted S: | 0 | 0 | 0 | 0 | ... | 0 | $S_{31}$ | $S_{30}$ | $S_{29}$ |

In an operation 652, the interim value M can be shifted left in shift left logic 750 as follows (for a shift of r=3):

| Input M: | $M_{31}$ | $M_{30}$ | $M_{29}$ | $M_{28}$ | ... | $M_4$ | $M_3$ | $M_2$ | $M_1$ | 0 |
|---|---|---|---|---|---|---|---|---|---|---|
| Shifted M: | $M_{28}$ | $M_{27}$ | $M_{26}$ | $M_{25}$ | ... | $M_1$ | 0 | 0 | 0 | 0 |

In an operation 654, the interim value N can be shifted left in shift left logic 755 as follows (for a shift of r=3):

| Input N: | $N_{31}$ | $N_{30}$ | $N_{29}$ | $N_{28}$ | ... | $N_3$ | $N_2$ | $N_1$ | 0 |
|---|---|---|---|---|---|---|---|---|---|
| Shifted N: | $N_{28}$ | $N_{27}$ | $N_{26}$ | $N_{25}$ | ... | $N_1$ | 0 | 0 | 0 |

The shift right logic 745 and the shift left logic 750 and 755 are required to re-order the result bits. Recall that in the MD5 logic implementation 500, that the T value was rotated in rotation logic 535. However, in the improved MD5 logic implementation 700, T is not rotated however, B is rotated in rotation logic 710. As a result of these rotation differences, the bits are not in the order and the shift right logic 745, the position bit logic 775, the shift left logic 750 and the shift left logic 755 rearrange the bits to the correct locations. In an operation 656, the MSB of interim values T, H and S (i.e., $T_{32}$, $H_{32}$ and $S_{32}$) and the LSB of interim value K (i.e., $K_0$) are input to the control logic 760. The control logic 760 includes an exclusive OR such that the control logic outputs a 1 when an odd number of the input bits are 1

At a time T5 and in an operation 670, the MSB of the control logic 760 output is analyzed. If the MSB of the control logic 760 output is not a 1 then, in an operation 672, the mux logic 765 selects and outputs the shifted M value. If the MSB of the control logic 760 output is a 1 then, in an operation 674, the mux logic 765 selects and outputs the shifted N value. The LSB of the control logic 760 output is the position bit. The position bit determines the value of the bit at the rotation position. By way of example, as described above, the rotation value in this example is set at 3, therefore the rotation bit position is bit 3 where the next B (i.e., B') includes bits $B'_{31}$, $B'_{30}, B'_{29}, B'_{28}, \ldots, B'_4$, LSB, $B'_2, B'_1, B'_0$. To save area on the integrated circuit die, the two left shifters 750 and 755 before mux 765 may be replaced with one left shifter after mux 765. However, this arrangement may not be as fast as having the left shifting done before mux 765. If only one left shifter after mux 765 is used, it may still operate substantially at the same time as the right shifter since the output of both shifters are used by OR gate 780.

At a time T6, and in an operation 680, the position bit, the right shifted S value and the output of the mux logic 765 are combined in an OR logic 780 to produce the next B value (i.e., B'). For the MSB of the control logic output is 0 and the shifted M is selected:

| | $M_{28}$ | $M_{27}$ | $M_{26}$ | $M_{25}$ | ... | $M_1$ | 0 | 0 | 0 | 0 |
|---|---|---|---|---|---|---|---|---|---|---|
| | 0 | 0 | 0 | 0 | ... | 0 | 0 | $S_{31}$ | $S_{30}$ | $S_{29}$ |
| − | 0 | 0 | 0 | 0 | ... | 0 | LSB | 0 | 0 | 0 |
| $B'_{31}$ | $B'_{30}$ | $B'_{29}$ | $B'_{28}$ | ... | $B'_4$ | $B'_3$ | $B'_2$ | $B'_1$ | $B'_0$ |

For the MSB of the control logic output is 1 and the shifted N is selected:

| | $N_{28}$ | $N_{27}$ | $N_{26}$ | $N_{25}$ | ... | $N_1$ | 0 | 0 | 0 | 0 |
|---|---|---|---|---|---|---|---|---|---|---|
| | 0 | 0 | 0 | 0 | ... | 0 | 0 | $S_{31}$ | $S_{30}$ | $S_{29}$ |
| − | 0 | 0 | 0 | 0 | ... | 0 | LSB | 0 | 0 | 0 |
| $B'_{31}$ | $B'_{30}$ | $B'_{29}$ | $B'_{28}$ | ... | $B'_4$ | $B'_3$ | $B'_2$ | $B'_1$ | $B'_0$ |

At a time T7, and in an operation 690, the next A, next B, next C, next D, and X values are updated.

The results for the example described above can be found in Table 1 below where Z is the output of the control logic and $Z = K_0 + S_{32} + H_{32} - T_{32}$:

TABLE 1

| Control Logic | | | | | Next B Value (i.e., B') | | | | | | | | |
|---|---|---|---|---|---|---|---|---|---|---|---|---|---|
| $S_{32}$ | $H_{32}$ | $T_{32}$ | $K_0$ | Z | $B'_{31}$ | $B'_{30}$ | $B'_{29}$ | $B'_{28}$ | ... | $B'_3$ | $B'_2$ | $B'_1$ | $B'_0$ |
| 0 | 0 | 0 | 0 | 0 | $M_5$ | $M_4$ | $M_3$ | $M_2$ | $M_1$ | 0 | $S_{31}$ | $S_{30}$ | $S_{29}$ |
| 0 | 0 | 0 | 1 | 1 | $M_5$ | $M_4$ | $M_3$ | $M_2$ | $M_1$ | 1 | $S_{31}$ | $S_{30}$ | $S_{29}$ |
| 0 | 0 | 1 | 0 | | cannot occur as $S_{32} + H_{32}$ cannot be less than or equal to $T_{32}$ | | | | | | | | |
| 0 | 0 | 1 | 1 | | | | | | | | | | |

TABLE 1-continued

| | Control Logic | | | | | | | Next B Value (i.e., B') | | | | | |
|---|---|---|---|---|---|---|---|---|---|---|---|---|---|
| $S_{32}$ | $H_{32}$ | $T_{32}$ | $K_0$ | Z | $B'_{31}$ | $B'_{30}$ | $B'_{29}$ | $B'_{28}$ | ... | $B'_3$ | $B'_2$ | $B'_1$ | $B'_0$ |
| 0 | 1 | 0 | 0 | 1 | $M_5$ | $M_4$ | $M_3$ | $M_2$ | $M_1$ | 1 | $S_{31}$ | $S_{30}$ | $S_{29}$ |
| 0 | 1 | 0 | 1 | 2 | $N_5$ | $N_4$ | $N_3$ | $N_2$ | $N_1$ | 0 | $S_{31}$ | $S_{30}$ | $S_{29}$ |
| 0 | 1 | 1 | 0 | 0 | $M_5$ | $M_4$ | $M_3$ | $M_2$ | $M_1$ | 0 | $S_{31}$ | $S_{30}$ | $S_{29}$ |
| 0 | 1 | 1 | 1 | 1 | $M_5$ | $M_4$ | $M_3$ | $M_2$ | $M_1$ | 1 | $S_{31}$ | $S_{30}$ | $S_{29}$ |
| 1 | 0 | 0 | 0 | 1 | $M_5$ | $M_4$ | $M_3$ | $M_2$ | $M_1$ | 1 | $S_{31}$ | $S_{30}$ | $S_{29}$ |
| 1 | 0 | 0 | 1 | 2 | $N_5$ | $N_4$ | $N_3$ | $N_2$ | $N_1$ | 0 | $S_{31}$ | $S_{30}$ | $S_{29}$ |
| 1 | 0 | 1 | 0 | 0 | $M_5$ | $M_4$ | $M_3$ | $M_2$ | $M_1$ | 0 | $S_{31}$ | $S_{30}$ | $S_{29}$ |
| 1 | 0 | 1 | 1 | 1 | $M_5$ | $M_4$ | $M_3$ | $M_2$ | $M_1$ | 1 | $S_{31}$ | $S_{30}$ | $S_{29}$ |
| 1 | 1 | 0 | 0 | | cannot occur as $S_{32} + H_{32}$ cannot be greater than or equal to $T_{32} + 1$ | | | | | | | | |
| 1 | 1 | 0 | 1 | | | | | | | | | | |
| 1 | 1 | 1 | 0 | 1 | $M_5$ | $M_4$ | $M_3$ | $M_2$ | $M_1$ | 1 | $S_{31}$ | $S_{30}$ | $S_{29}$ |
| 1 | 1 | 1 | 1 | 2 | $N_5$ | $N_4$ | $N_3$ | $N_2$ | $N_1$ | 0 | $S_{31}$ | $S_{30}$ | $S_{29}$ |

The notation MSB indicates the most significant bit of Z and notation LSB indicates the least significant bit of Z. Note that N is selected if and only if Z=2 (i.e., MSB=1) and that B'3 (in this example where r=3) is 1 if and only if Z=1 (i.e., LSB=1). The $B'_3$ value (i.e., value of the rotation bit) is the exclusive OR of the four case variables (i.e., $B'_3 = S_{32} \wedge H_{32} \wedge T_{32} \wedge K_0$).

Figure 8:
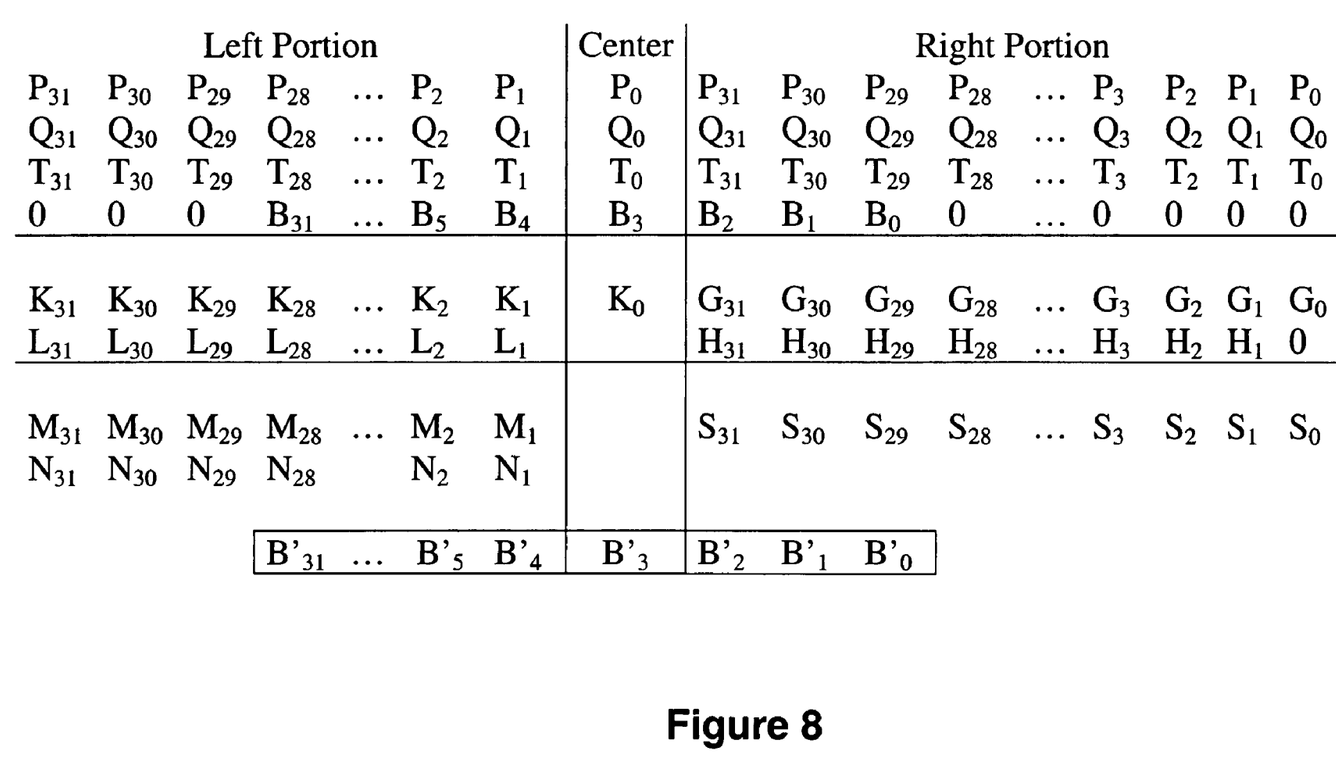
FIG. 8 is a summary chart for each iteration of the MD5 algorithm, in accordance with one embodiment of the present invention.

FIG. 8 is a summary chart for each iteration of the MD5 algorithm, in accordance with one embodiment of the present invention. The new B value (B') is shown at the bottom. The calculations used to arrive at the B' value are divided into three portions: a left portion, a center portion, and a right portion. The center portion is the position of rotation. As used in the above examples, the rotation bit is the third bit, therefore the center portion is located at the bit position to the left of the rotation bit (i.e., $B'_3$). Recall that the actual rotation bit is determined by the iteration count and therefore the center portion can move left or right accordingly.

The left portion is the portion of the B' value that is left of the center portion. Similarly, the right portion is the portion of the B' value that is right of the center portion.

Figure 9:
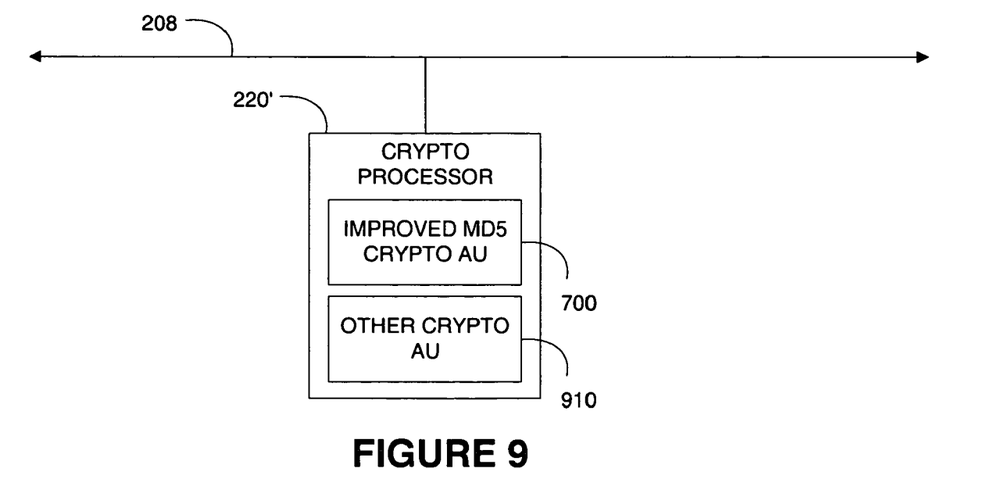
FIG. 9 is a peripheral cryptographic processor, in accordance with one embodiment of the present invention.

FIG. 9 is a peripheral cryptographic processor 220', in accordance with one embodiment of the present invention. The peripheral cryptographic processor 220' includes the improved MD5 arithmetic logic unit 700. The peripheral cryptographic processor 220' can also include one or more other arithmetic logic units 910 that can process one or more other hash algorithms (e.g., SHA-family of hash algorithms).

Figure 10:
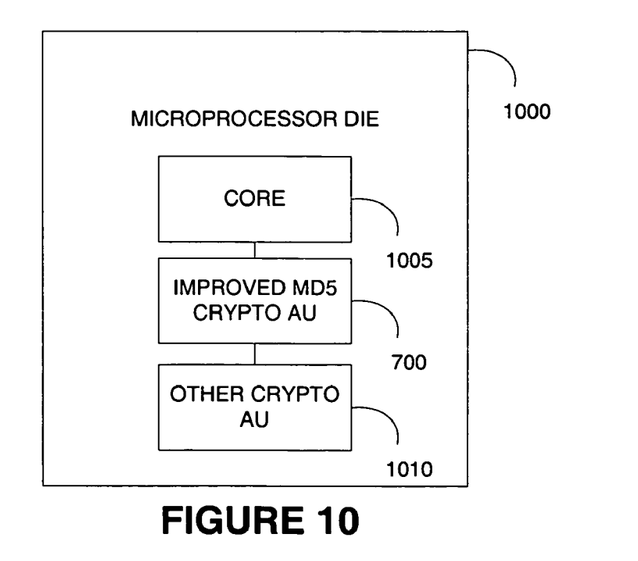
FIG. 10 is a microprocessor die, in accordance with one embodiment of the present invention.

FIG. 10 is a microprocessor die 1000, in accordance with one embodiment of the present invention. The microprocessor die 1000 includes the improved MD5 arithmetic logic unit 700 coupled to the processing core 1005. The microprocessor die 1000 can also include one or more other arithmetic logic units 1010 that can process one or more other hash algorithms (e.g., SHA-family of hash algorithms) that are also coupled to the processing core 1005.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in any of the figures are not required to be performed in the order illustrated, and that all the processing represented by the operations may not be necessary to practice the invention. Further, the processes described in any of the figures can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. An MD5 arithmetic unit comprising:
   a plurality of carry look-ahead adders, wherein the plurality of carry look-ahead adders are configured to execute substantially simultaneously wherein an interim MD5 value Q and a interim MD5 value P are coupled to corresponding inputs of a first one of the plurality of carry look-ahead adders and wherein an interim MD5 value H and a interim MD5 value G are coupled to corresponding inputs of a second one of the plurality of carry look-ahead adders and wherein have an interim MD5 value L and a interim MD5 value K are coupled to corresponding inputs of a third one and a fourth one of the plurality of carry look-ahead adders.

2. The MD5 arithmetic unit of claim 1, further comprising a 4 to 2 compressor, wherein the corresponding inputs of the first one of the plurality of carry look-ahead adders is coupled to the corresponding pair of outputs of the 4 to 2 compressor.

3. The MD5 arithmetic unit of claim 1, further comprising a pair of full adders, wherein the pair of full adders are configured to execute substantially simultaneously.

4. The MD5 arithmetic unit of claim 1, further comprising a control logic having at least one input coupled to at least one of the input of at least one of the plurality of carry look-ahead adders and having at least one input coupled to at least one output of at least one of the plurality of carry look-ahead adders.

5. The MD5 arithmetic unit of claim 4, further comprising a pair of full adders having two inputs coupled to a corresponding pair of outputs of the 4 to 2 compressor.

6. The MD5 arithmetic unit of claim 5, wherein the control logic includes:
- a first input coupled to an output of the first one of the plurality of carry look-ahead adders;
- a second input coupled to a first output of a first one of the pair of full adders;
- a third input coupled to a first output of a second one of the pair of full adders; and
- a fourth input coupled to an output of a second one of the plurality of carry look-ahead adders.

7. The MD5 arithmetic unit of claim 4, wherein the pair of full adders are configured to execute substantially simultaneously.

8. The MD5 arithmetic unit of claim 1, wherein the plurality of carry look-ahead adders include four of carry look-ahead adders.

9. The MD5 arithmetic unit of claim 1, further comprising a plurality of shift logic.

10. The MD5 arithmetic unit of claim 9, wherein the plurality of shift logic include:
- a shift right logic; and
- at least one shift left logic.

11. The MD5 arithmetic unit of claim 9, wherein the plurality of shift logic are configured to execute substantially simultaneously.

12. The MD5 arithmetic unit of claim 1, wherein the MD5 arithmetic unit is included on a single die with a microprocessor.

13. The MD5 arithmetic unit of claim 1, wherein the MD5 arithmetic unit is coupled to a microprocessor.

14. The MD5 arithmetic unit of claim 13, wherein the MD5 arithmetic unit is coupled to the microprocessor by a bus.

15. The MD5 arithmetic unit of claim 1, wherein the MD5 arithmetic unit is coupled to a computer.

16. An integrated circuit comprising:
- an MD5 arithmetic unit including a plurality of carry look-ahead adders, wherein the plurality of carry look-ahead adders are configured to execute substantially simultaneously wherein an interim MD5 value Q and a interim MD5 value P are coupled to corresponding inputs of a first one of the plurality of carry look-ahead adders and wherein an interim MD5 value H and a interim MD5 value G are coupled to corresponding inputs of a second one of the plurality of carry look-ahead adders and wherein have an interim MD5 value L and a interim MD5 value K are coupled to corresponding inputs of a third one and a fourth one of the plurality of carry look-ahead adders.

17. The integrated circuit of claim 16, further comprising a microprocessor core coupled to the MD5 arithmetic unit.

18. The integrated circuit of claim 16, further comprising:
- a 4 to 2 compressor;
- a pair of full adders having two inputs coupled to a corresponding pair of outputs of the 4 to 2 compressor, wherein the corresponding inputs of the first one of the plurality of carry look-ahead adders is coupled to the corresponding pair of outputs of the 4 to 2 compressor; and
- a control logic including:
  - a first input coupled to an output of the first one of the plurality of carry look-ahead adders;
  - a second input coupled to a first output of a first one of the pair of full adders;
  - a third input coupled to a first output of a second one of the pair of full adders; and
  - a fourth input coupled to an output of a second one of the plurality of carry look-ahead adders.

19. A method of executing an MD5 algorithm comprising:
- initializing a plurality of MD5 variables including and X, Y, A, B, C, and D variables;
- selecting a MD5 function;
- applying the selected MD5 function to the B, C and D variables to produce an interim value E;
- applying the X, Y, A and E to a 4 to 2 compressor to produce a pair of outputs including an MD5 interim value Q and an interim value P;
- coupling the pair of outputs to a plurality of carry look-ahead adders; and
- executing a plurality of carry look-ahead adders substantially simultaneously wherein the interim MD5 value Q and the interim MD5 value P are coupled to corresponding inputs of a first one of the plurality of carry look-ahead adders and wherein an interim MD5 value H and a interim MD5 value G are coupled to corresponding inputs of a second one of the plurality of carry look-ahead adders and wherein have an interim MD5 value L and a interim MD5 value K are coupled to corresponding inputs of a third one and a fourth one of the plurality of carry look-ahead adders.

20. The method of claim 19, wherein coupling the pair of outputs to the plurality of carry look-ahead adders includes coupling the pair of outputs directly to the first one of the plurality of carry look-ahead adders.

21. The method of claim 19, wherein coupling the pair of outputs to the plurality of carry look-ahead adders includes:
- coupling the pair of outputs to a pair of full adders;
- coupling a pair of outputs from the first one of the pair of full adders to a second carry look-ahead adder; and
- coupling a pair of outputs from the second one of the pair of full adders to a third carry look-ahead adder and a fourth carry look-ahead adder.

22. The method of claim 21, further comprising executing the pair of full adders substantially simultaneously.

23. The method of claim 21, further comprising shifting a corresponding output of each one of the second, third and fourth carry look-ahead adders.

24. The method of claim 23, further comprising shifting the corresponding output of each one of the second, third and fourth carry look-ahead adders substantially simultaneously.

* * * * *